(12) United States Patent
Aciicmez et al.

(10) Patent No.: US 8,055,848 B2
(45) Date of Patent: Nov. 8, 2011

(54) METHOD AND SYSTEM FOR SECURING INSTRUCTION CACHES USING SUBSTANTIALLY RANDOM INSTRUCTION MAPPING SCHEME

(75) Inventors: Onur Aciicmez, San Jose, CA (US);
Jean-Pierre Seifert, San Jose, CA (US);
Qingwei Ma, Fremont, CA (US);
Xinwen Zhang, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 647 days.

(21) Appl. No.: 12/183,689

(22) Filed: Jul. 31, 2008

(65) Prior Publication Data

US 2010/0030967 A1    Feb. 4, 2010

(51) Int. Cl.
*G06F 12/08* (2006.01)

(52) U.S. Cl. ............... 711/125; 711/202; 711/E12.017

(58) Field of Classification Search .................. 711/125, 711/202, E12.017
See application file for complete search history.

(56) References Cited

U.S. PATENT DOCUMENTS

| | | | | |
|---|---|---|---|---|
| 7,788,650 | B2 * | 8/2010 | Johnson et al. | 717/140 |
| 2008/0229052 | A1 * | 9/2008 | Ozer et al. | 711/202 |

* cited by examiner

*Primary Examiner* — Yong Choe
(74) *Attorney, Agent, or Firm* — Beyer Law Group LLP (57) ABSTRACT

A method and system is provided for securing micro-architectural instruction caches (I-caches). Securing an I-cache involves maintaining a different substantially random instruction mapping policy into an I-cache for each of multiple processes, and for each process, performing a substantially random mapping scheme for mapping a process instruction into the I-cache based on the substantially random instruction mapping policy for said process. Securing the I-cache may further involve dynamically partitioning the I-cache into multiple logical partitions, and sharing access to the I-cache by an I-cache mapping policy that provides access to each I-cache partition by only one logical processor.

40 Claims, 9 Drawing Sheets

Simultaneous Multithreading Core
2 logical processors
with separate dedicated I-cache FIG. 1
Prior art

Multi - Core Processor with 2 physical cores and each core has its own dedicated separate I-cache

FIG. 9A

Multi - Core Processor with 2 physical cores and a shared I-cache

METHOD AND SYSTEM FOR SECURING INSTRUCTION CACHES USING SUBSTANTIALLY RANDOM INSTRUCTION MAPPING SCHEME

FIELD OF THE INVENTION

The present invention relates to instruction caches, and in particular, to securing instruction caches.

BACKGROUND OF THE INVENTION

Current microprocessors employ an instruction cache (I-cache) to increase the performance of a system. An I-cache stores the most frequently executed instructions and provides the processor easy and fast access to these instructions. While increasing the performance of the system, I-cache architectures also create several security weaknesses.

Figure 1:
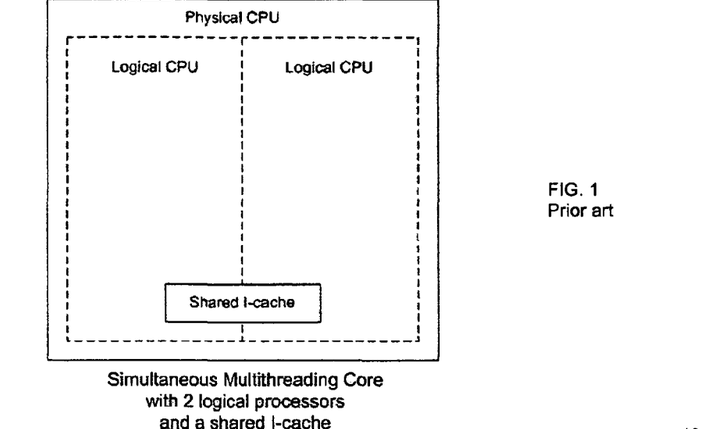
FIG. 1 shows a conventional instruction cache (I-cache) shared between two logical processes.

One security weakness in conventional implementations of I-cache structures involves shared I-cache units in simultaneous multi-threaded (SMT) and/or multi-core systems, wherein I-cache units are shared between different logical or physical microprocessors (FIG. 1). If two or more processes are executing simultaneously on the same system and if the I-cache is shared between these processes, then a malicious process can indirectly observe the execution of security critical applications and discover confidential values based therein by analyzing I-cache modifications.

Another security weakness in conventional implementations of I-cache structures involves instruction mapping. The mapping process (mapping policy) is performed when a new instruction entry is to be written to I-cache, or an existing I-cache entry needs to be searched in I-cache. The mapping process decides where to store, and look for, I-cache entries in the I-cache.

In typical processor architectures, a particular instruction can only be stored in a particularly small set of I-cache locations in a strictly deterministic way. In other words, it is trivial to find out which locations of an I-cache can store a particular instruction. Due to this predictability, a malicious process can determine where a specific security-critical instruction can be found in I-cache and thus observe the execution of such an instruction. As such, the malicious process can discover when a process executes critical instructions, and, therefore, reveal the execution flow. The execution flow can expose the secret values used in the process.

BRIEF SUMMARY OF THE INVENTION

The present invention provides a method and system for securing micro-architectural instruction caches (I-caches). One embodiment involves maintaining a different substantially random instruction mapping policy into an I-cache for each of multiple processes, and for each process, performing a substantially random mapping scheme for mapping a process instruction into the I-cache based on the substantially random instruction mapping policy for said process.

The multiple processes may include security critical process instructions, such that maintaining a different substantially random instruction mapping policy into an I-cache for each of multiple processes includes maintaining a different substantially random instruction mapping policy into the I-cache for each of multiple security critical processes.

Securing the I-cache may further involve dynamically partitioning the I-cache into multiple logical partitions, and sharing access to the I-cache by an I-cache mapping policy that provides access to each I-cache partition by only one logical processor.

These and other features, aspects and advantages of the present invention will become understood with reference to the following description, appended claims and accompanying figures.

DETAILED DESCRIPTION OF THE INVENTION

The present invention provides a method and system for securing micro-architectural instruction caches. One embodiment involves implementing partitioned or separate I-cache modules in a processor to prevent I-cache analysis on logical or physical multi-core microprocessors with simultaneous multithreading. In one example, a single I-cache is partitioned into separate partitions, wherein each partition is used by a different processor. In another example, a dedicated I-cache is used for each logical and physical processor.

Further, for additional security, an I-cache mapping policy is utilized to reduce predictability of instruction mapping in conventional I-cache, wherein according to one embodiment of the invention, a substantially random instruction mapping strategy is implemented.

Figure 2:
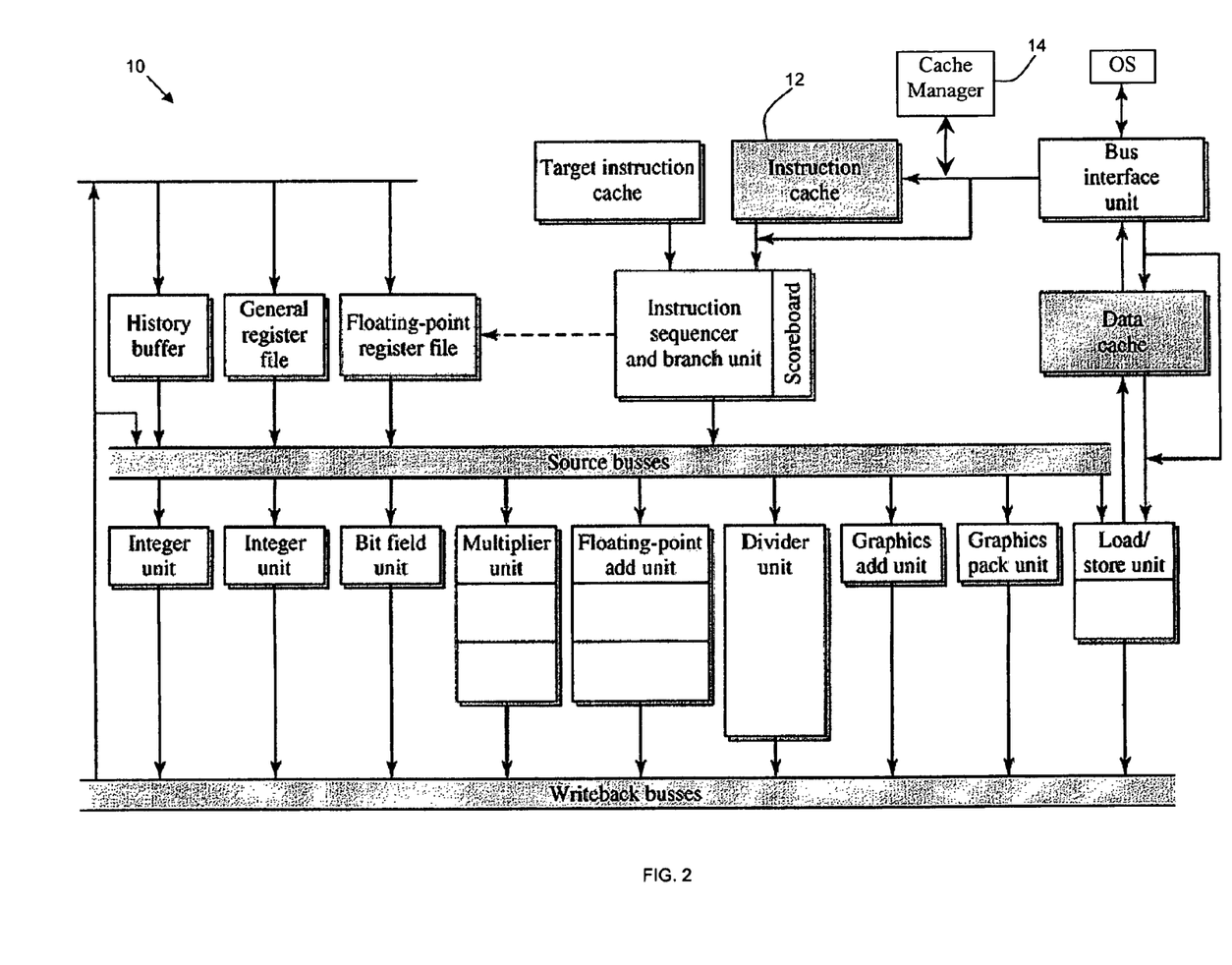
FIG. 2 shows a processing system including an I-cache system, according to an embodiment of the invention.

FIG. 2 shows a functional block diagram of a computing environment architecture 10 implementing an embodiment of the present invention. The architecture 10 includes an I-cache system 12 and a cache manager 14. The cache manager 14 controls the function of the I-cache. In one embodiment, the cache manager 14 comprises the control logic of the I-cache and is considered as a part of I-cache instead of separate logic. This control logic implements dynamic detection of critical code sections/processes (possibly in collaboration with the operating system), and dynamic I-cache partitioning including determining the number of I-cache partitions, size of partitions, assignment of partitions, etc. Furthermore, the I-cache manager implements generating substantially random (e.g., random or pseudorandom) numbers for substantially random I-cache instructing mapping, updating seeds, substantially randomizing the index section of the instruction address, etc. The cache manager also implements mapping policy, replacement algorithm, etc.

The I-cache system 12 may comprise one or more I-cache modules. In one implementation, for each physical or logical processor, different physical I-cache locations are used, whether in the same I-cache module or as separate independent I-cache modules.

Figure 3:
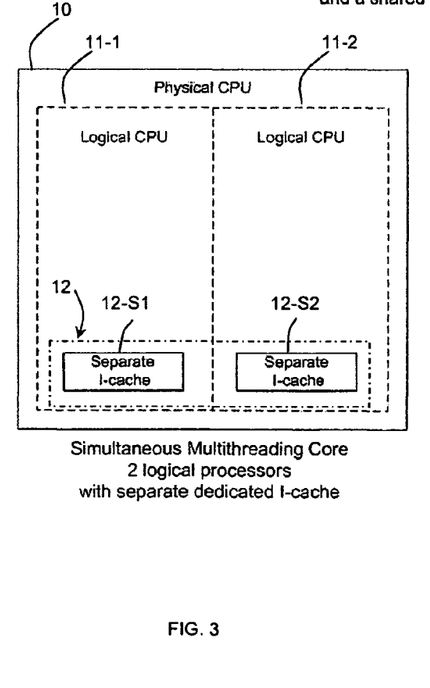
FIG. 3 shows an I-cache system including dedicated I-cache modules.
Figure 4:
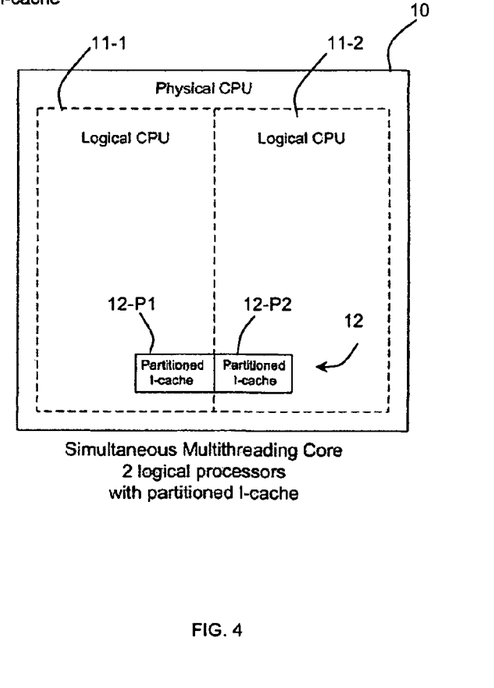
FIG. 4 shows an I-cache system including a partitioned I-cache module, according to an embodiment of the invention.

FIG. 3 shows two separate (dedicated) I-cache modules 12-S1 and 12-S2 corresponding to the two logical processors 11-1, 11-2, respectively. FIG. 4 shows example implementation of the I-cache system 12 for a SMT processor with two logical processors 11-1, 11-2, according to the invention. Specifically, FIG. 4 shows a shared physical I-cache module 12 that is dynamically partitioned into two partitioned areas 12-P1, 12-P2, corresponding to the two logical processors 11-1, 11-2, respectively. The partitioning can be implemented in many ways without changing the size of the I-cache. Dynamic partitioning of the I-cache is under the control of I-cache management which utilizes detection of critical processes and instruction sections and upon detection, partitions the I-cache and prohibits the usage of a partition assigned to a critical process by other processes.

Figure 5:
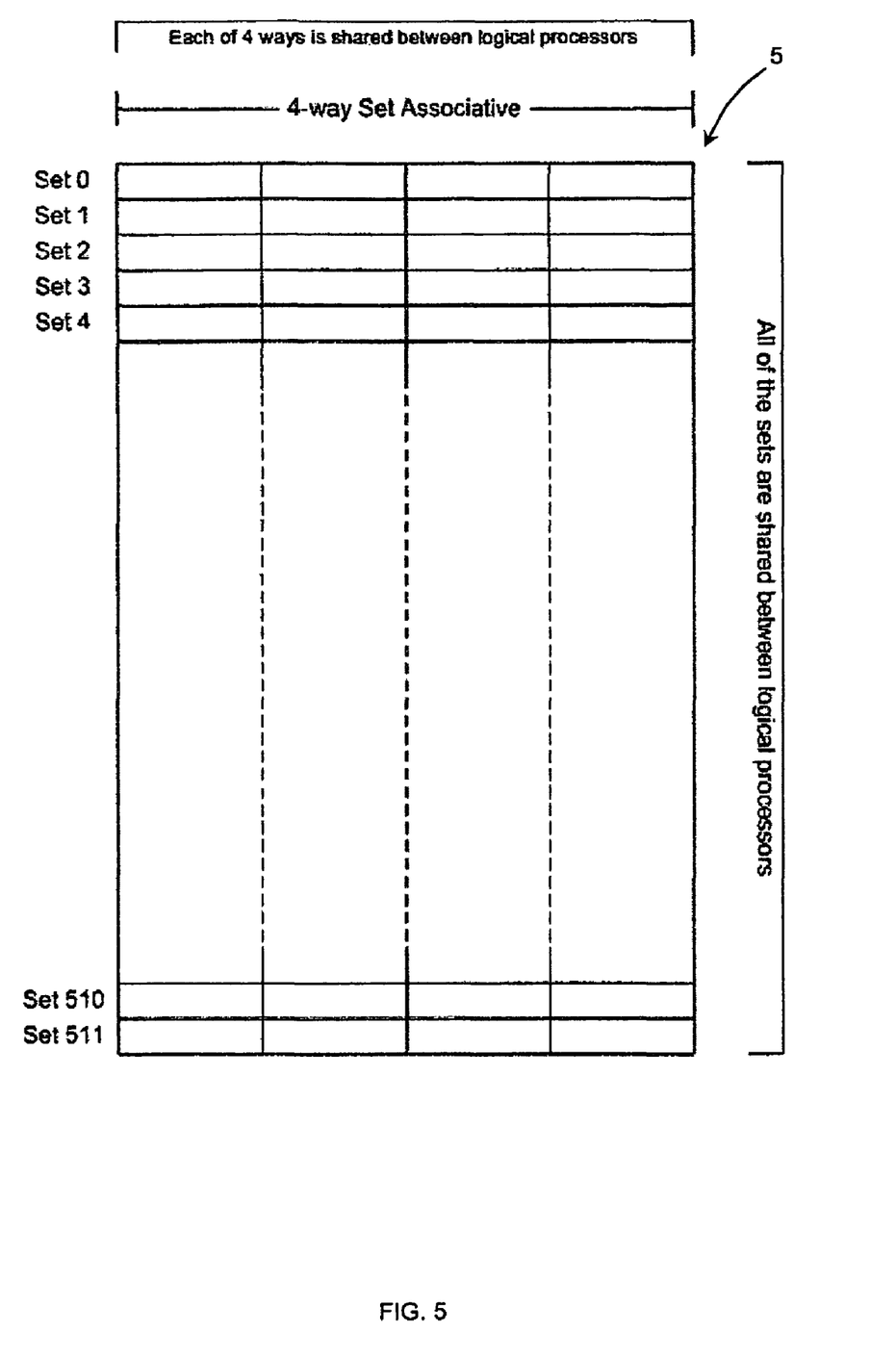
FIG. 5 shows an example 4-way set associative I-cache.
Figure 6:
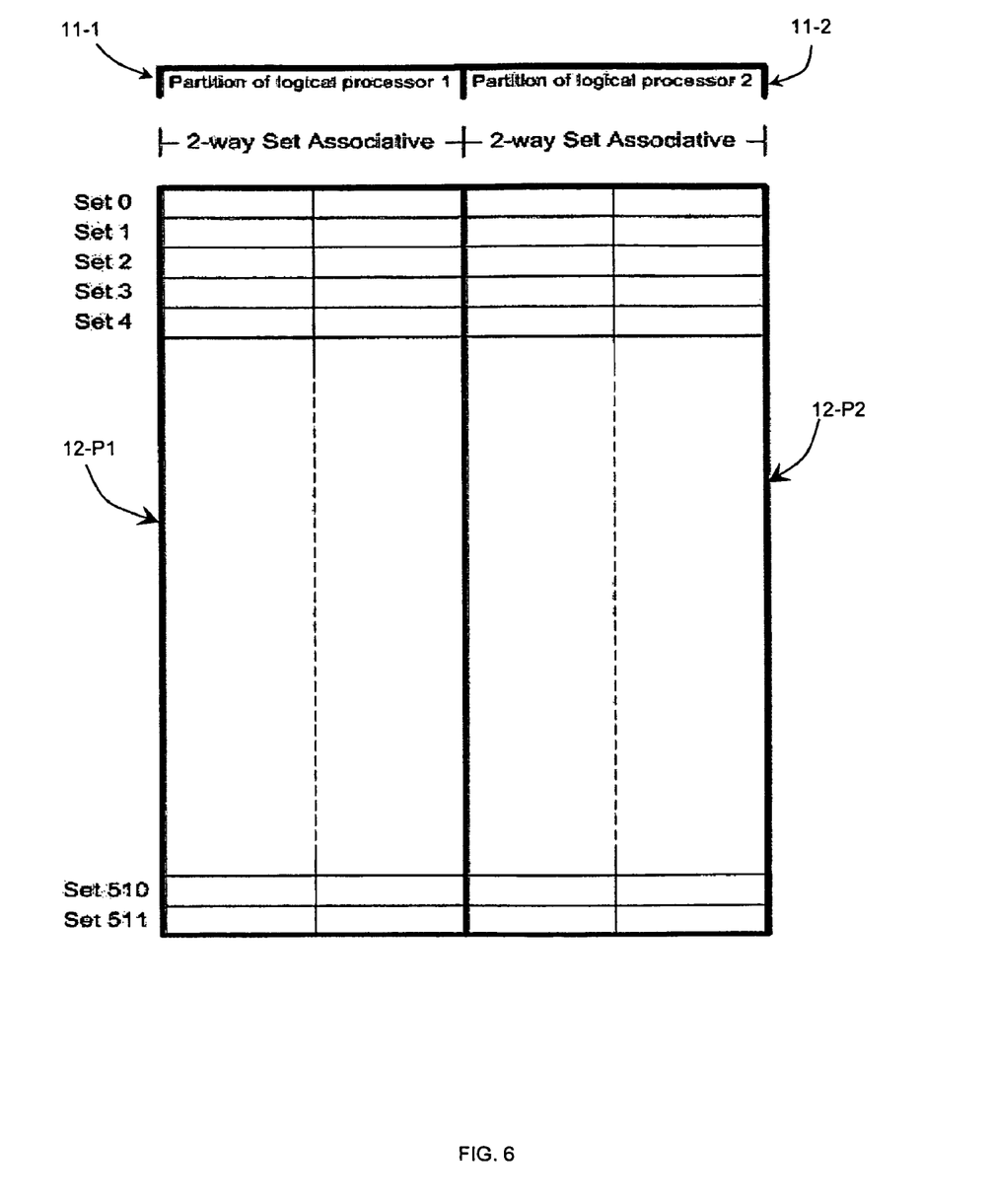
FIGS. 6-7 show examples of partitioning the I-cache of FIG. 5 according to the invention.
Figure 7:
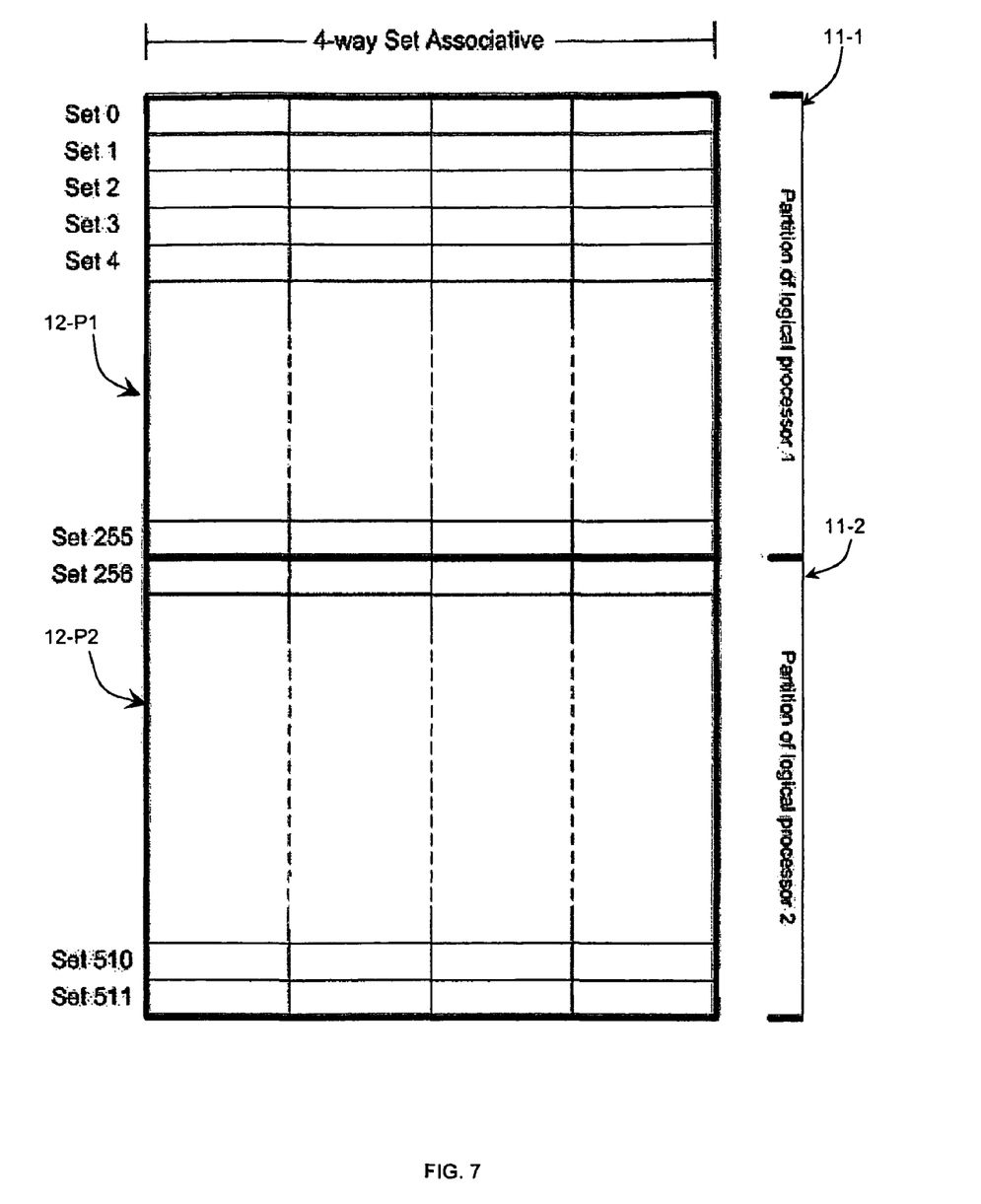

For example, a 4-way set associative I-cache 5 with 512 sets (FIG. 5) can be partitioned into two 2-way associative I-caches 12-P1 and 12-P2 (FIG. 6) with the same amount of sets, or the I-cache 5 can be partitioned into two 4-way associative I-caches 12-P1 and 12-P2 (FIG. 7) with 256 sets. During run-time, the cache manager 14 can switch between one 4-way set associative I-cache and two 2-way associative I-caches.

In one example, a software module such as the operating system (OS) can set a flag to indicate whether a critical application is running on a logical processor. If the flag is set, the cache manager 14 does not allow sharing of the I-cache between logical processors. Instead, the cache manager 14 dynamically partitions the I-cache such that different logical processors do not use the same I-cache locations.

The partitioning need not be processor based, and it can be for example process based. The I-cache can be partitioned so that a specific process can have exclusive access to a partition and the remainder of the cache can be shared among other processes. Another alternative is to combine both approaches. For example, half of the I-cache can be assigned to a logical processor and the other half to another logical processor. Further, the first half of the I-cache can be repartitioned to provide a critical process exclusive access to a partition in that first half of the I-cache, and other processes running on the first logical process can share the remaining part of the first half of the I-cache.

In addition, the partitioning can be in various sizes (e.g., $\frac{1}{4}^{th}$ of an I-cache is assigned to a logical processor and the remaining $\frac{3}{4}^{th}$ to another other logical processor). This is useful for process-based partitioning. If there is a critical process and several other non-critical processes are running on the system, it may be preferable (for performance) to allocate a small I-Cache partition to the critical process and leave the larger portion shared among non-critical processes. One implementation involves using one bit for logical processor ID and dynamically appending it to the index part of the instruction address to realize partitioning. If the length of the appendable portion is kept dynamic and changing from 1 bit to N bits (under the control of the I-cache management logic), then several partitions can be generated as small as $\frac{1}{2}^N$ of the original I-cache size. This approach may also incorporate a management logic that makes several decisions during run time, including the number of partitions, the length of partitions, the assignment of partitions (e.g. which process/processor is assigned to which partition), etc.

The cache manager 14 is implemented to allow dynamic partitioning. For example, in FIG. 7, there are 512 cache sets in total. When said flag is not set by the OS, 512 cache sets can be used by both logical processors (i.e., shared). When said flag is set by the OS, the cache manager 14 implements dynamic switching, wherein half of the 512 cache sets are used by one logical processor and the other half of the 512 cache sets are used by the other logical processor (i.e., partitioned).

Figure 8:
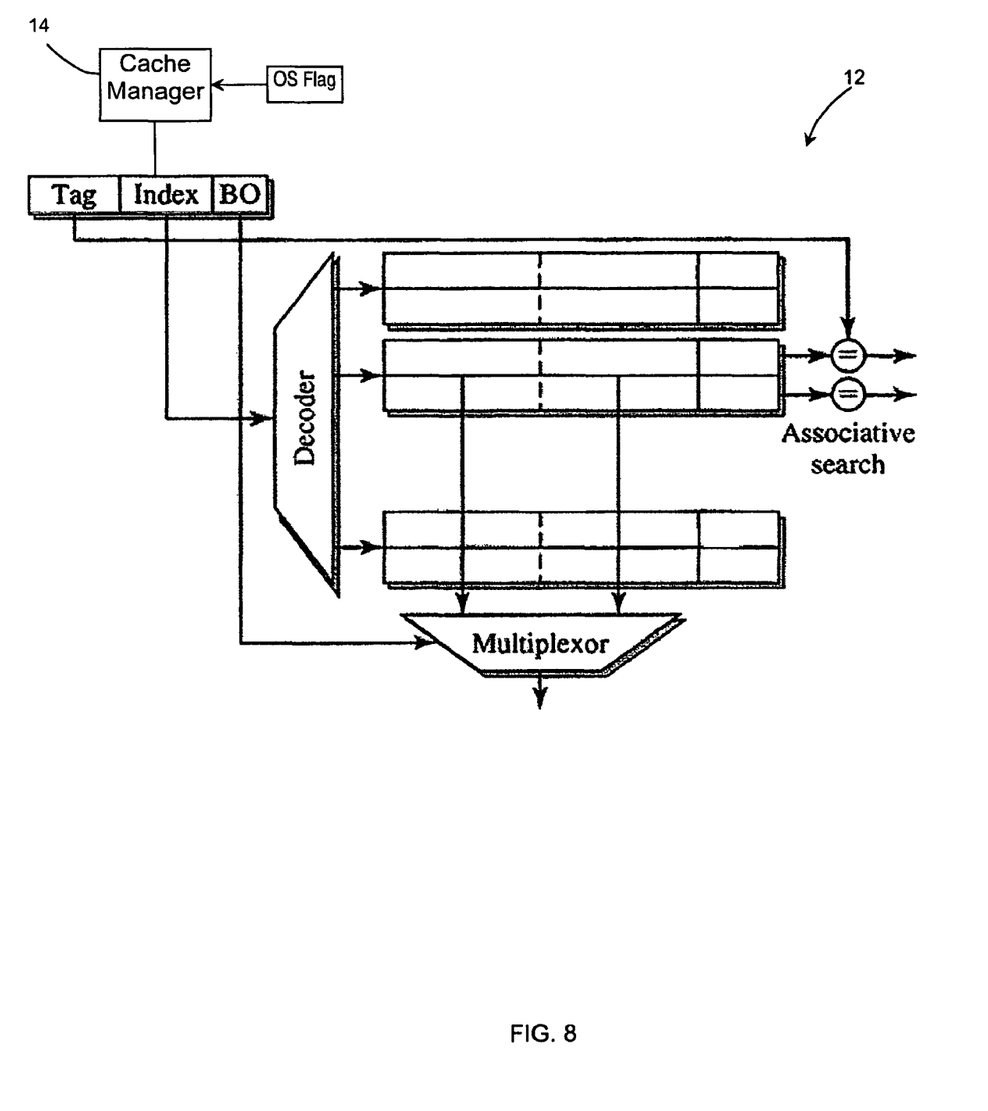
FIG. 8 shows a block diagram of an I-cache system, according to an embodiment of the invention.

The dynamic switching between shared and partitioned modes can be achieved by the cache manager 14 as a logic module to handle the index of the I-cache system 12 in FIG. 8. An example implementation in FIG. 8 is now described. Each cache location has a virtual address for an instruction, wherein the virtual address comprises different fixed sections (i.e., Tag, Index, BO).

If said OS flag is set, then the identification (ID) of the logical processor (e.g., either 0 or 1, assuming there are only 2 logical processors) that access the I-cache can be appended in front of the Index of the I-cache access to generate a new Index.

The new Index can be either less than 256 (e.g., maps to the upper half 12-P1 of the I-cache, FIG. 7) if it comes from logical processor 0 (e.g., logical processor 11-1), or it can be higher than 255 (e.g., maps to the lower half 12-P2 of the I-cache) if it comes from logical processor 1 (logical processor 11-2). The Size and Tag logic of the I-cache can be modified accordingly. For example, assume that the length of the tag is A bits and the index is B bits. In this case, a cache has $2^B$ sets. If the I-cache is partitioned by half into two, each partition will need an index of B-1 bits. In this example, processor ID is appended (i.e., either a 0 or 1), in front of the index. In this case, this bit determines the partition (e.g. upper of lower half in FIG. 7) and the rest of the index (i.e., B-1 bits) specifies the index of that partition. The first bit of the original un-appended index (the first bit of the B-bit index section) is not used, and this necessitates enlarging the tag section by 1 bit. For example, if the address of an instruction is:

0001 . . . 0101 1001 . . . 0001 where original tag= (0001 . . . 0101), original index=(1001 . . . 0011) and offset=01, then the I-cache is partitioned into 2 equal parts, the new tag would be (0001 . . . 0101 1) and the new index should become (x 001 . . . 0011) where x is the appended processor ID.

To partition the I-cache into four equal parts, then the tag=(0001 . . . 0101 10) and original index=(xy 01 . . . 0011). To partition the I-cache into eight equal parts, then the tag= (0001 . . . 0101 100) and original index=(xyz 1 . . . 0011). And, so on.

Figure 9A:
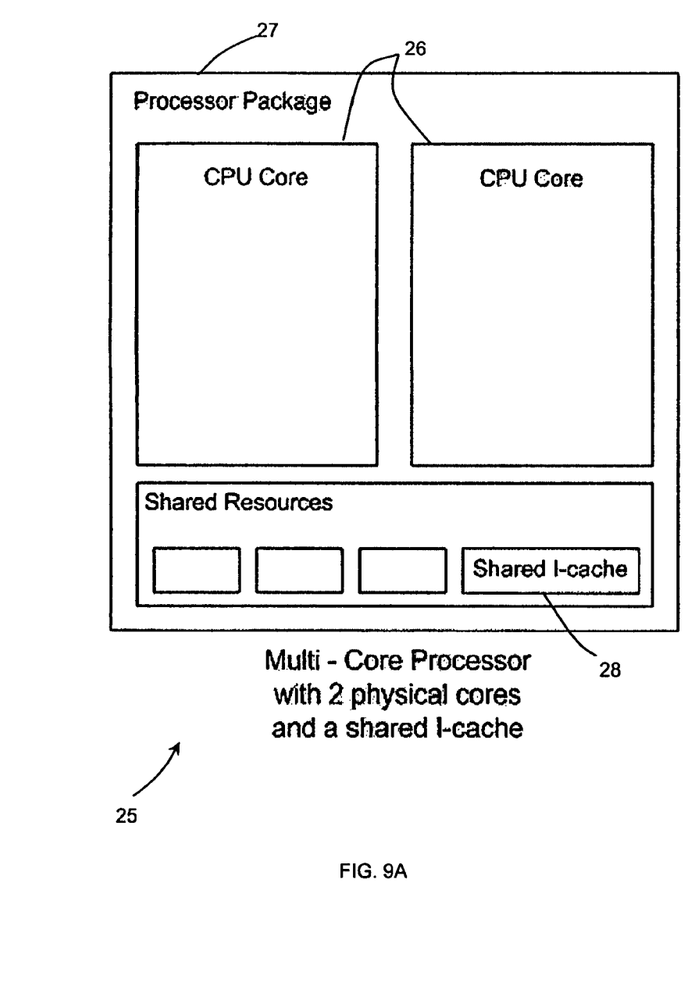
FIG. 9A shows a block diagram of typical I-cache system with a shared I-cache.
Figure 9B:
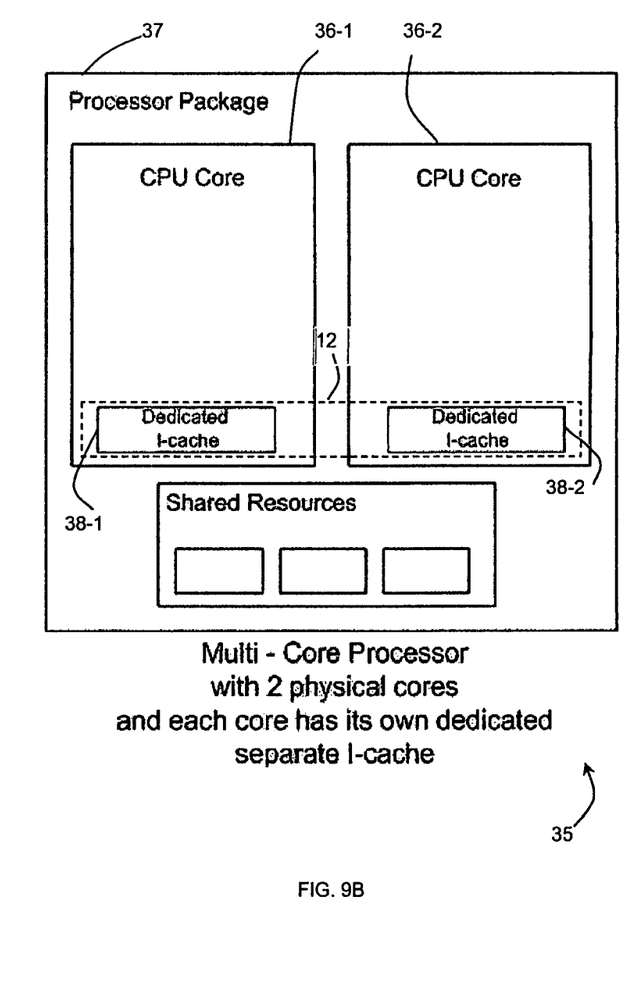
FIG. 9B shows a block diagram of an I-cache system with dedicated I-cache modules, according to another embodiment of the invention.

In a typical multi-core system 25 shown in FIG. 9A, there are multiple physical processor cores 26 in the same package 27 and resources including a typical I-cache 28 that is shared between these cores. According to an example dual-core system 35 in FIG. 9B according to the present invention, two physical processor cores 36-1, 36-2 reside in a single processor package 37 and separate dedicated unshared I-cache modules 38-1, 38-2, are implemented in the I-cache system 12, wherein each processor core only uses a dedicated unshared I-cache module.

For further security safeguarding of I-caches, the invention further provides substantially randomized I-cache mapping policy. The replacement policies of the I-cache are randomized (substantially randomized), to prevent malicious determination in advance of which I-cache locations can store a given instruction. Substantially randomizing I-cache mapping policy is implemented in one example by substantially randomizing the outcome of I-cache mapping.

In conventional I-cache architectures, the virtual address of an instruction (a static value) which comprises different fixed sections (Tag, Index, BO), can be easily determined. The conventional fixed Index leads to a deterministic mapping policy. The location of an instruction in an I-cache can be determined by this fixed static value of the conventional Index.

According to an embodiment of the present invention, however, a substantially randomized mapping policy is implemented for the Index, to provide a mapping policy that is not deterministic. An observer cannot determine which instructions of a process are located in which locations of I-cache because the Index is substantially randomized. Such substantially randomization can also be used in the replacement policy of an I-cache.

Figure 10:
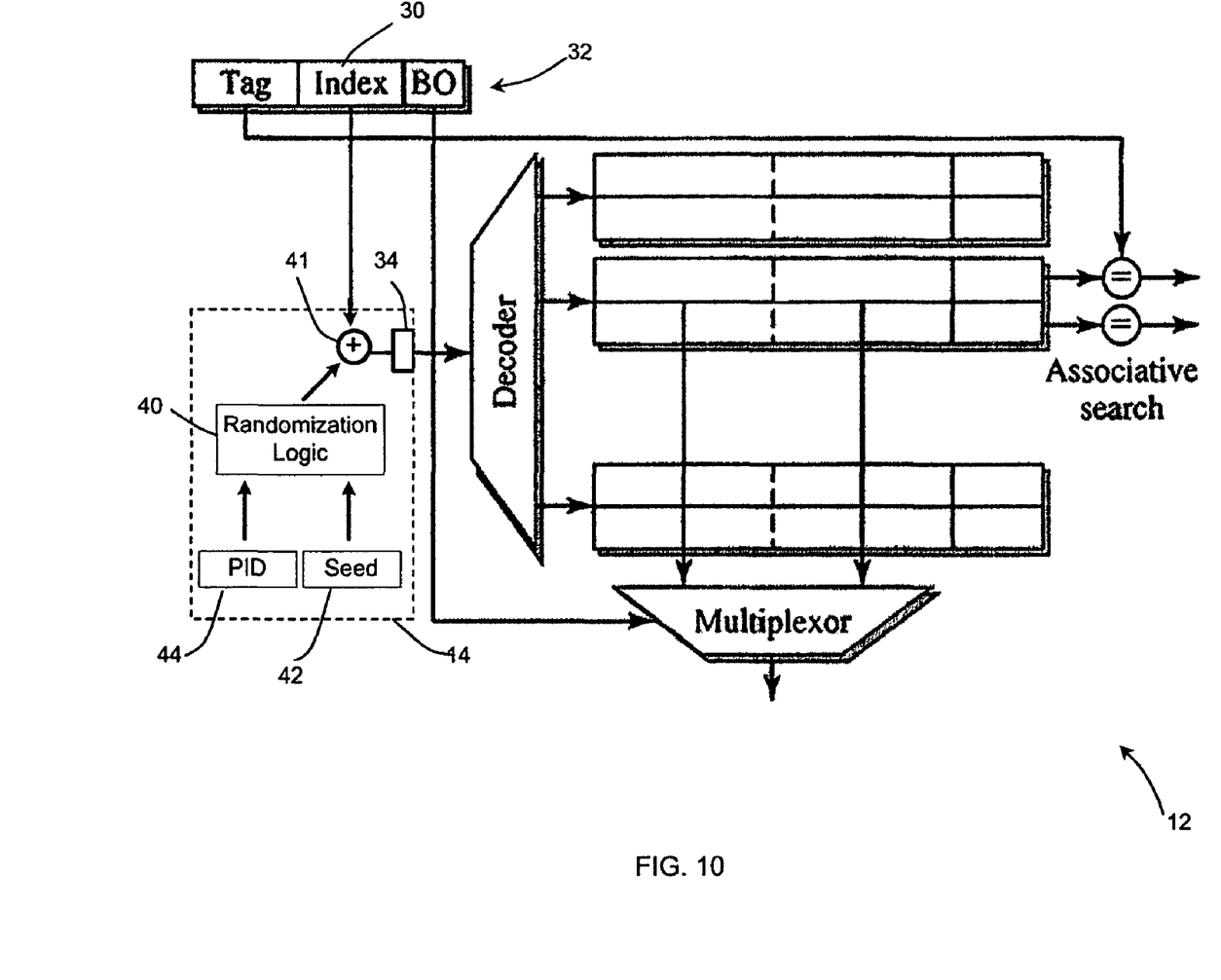
FIG. 10 shows a block diagram of an I-cache system implementing substantially randomized I-cache access policy, according to another embodiment of the invention.

One implementation of substantially randomized mapping policy is now described. FIG. 10 shows an implementation of the cache system 12 with substantially randomized instruction mapping policy. Instead of using the basic Index 30 section of a virtual address 32 directly, the Index 30 is substantially randomized and the substantially randomized Index 34 is used for the I-cache instruction mapping.

Figure 11:
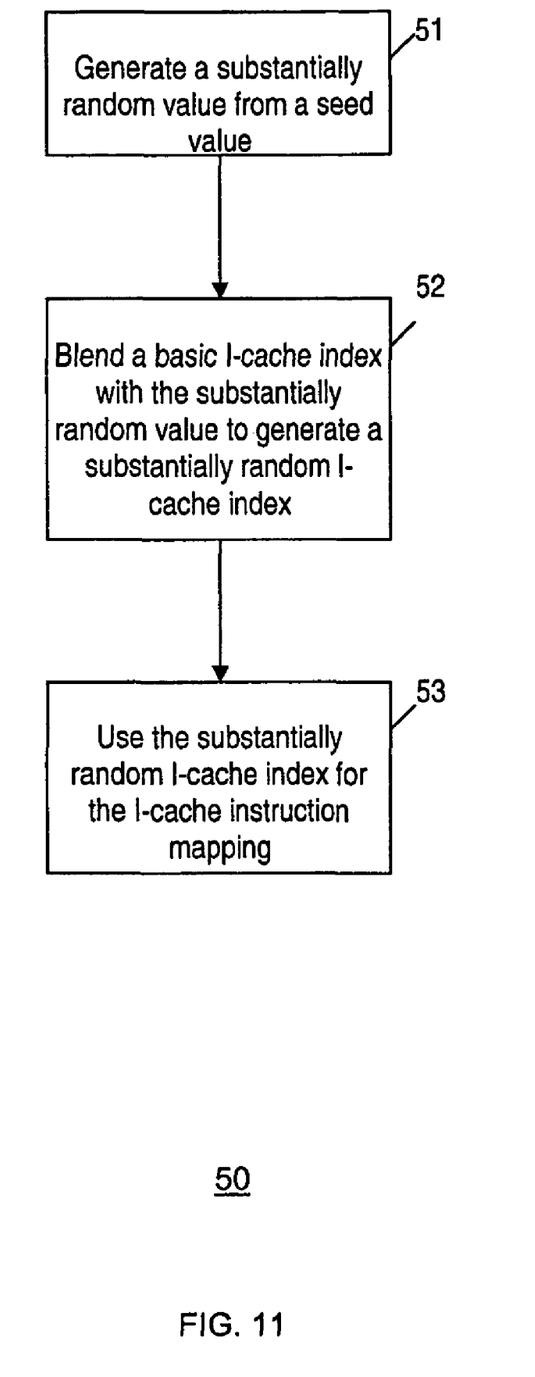
FIG. 11 shows a process 50 for substantially randomized instruction mapping policy, according to an embodiment of the invention.

FIG. 11 shows a process 50 for substantially randomized instruction mapping policy, according to an embodiment of the invention. The cache manager 14 includes a substantially randomization logic 40, which performs a randomization of the basic Index 30 using a random (or substantially random) value generated by the logic 40. The substantially randomization logic 40 uses a (substantially) random seed 42, which can be supplied by the OS, to initiate substantially random number generation (step 51). There are many ways to generate substantially random values. One way is to consecutively compute the hash values from an initial seed for each different I-cache access and select certain bits of the hash value to generate a substantially random number (alternatively, Linear-Feedback-Shift-Registers (LFSR) may be used to generate substantially random numbers). Updating the substantially random value for each access may not be required as a different substantially random value for each active process provides sufficient protection.

Therefore, in another example, the OS provides an identification of the currently running process (process identification (PID)) 44 to the processor (e.g., by setting a dedicated register) and an initial substantially random seed. The processor includes the cache system 12. The substantially randomization logic 40 generates substantially random values (which are different for different processes running on the processor, but the same for a particular process) using a function of both PID and the seed. The seed is preferably updated frequently, but not as frequently as in each I-cache access. This can be handled either by the OS or by the substantially randomization logic itself.

The output of the substantially randomization logic depends on the input values PID and seed, and changing even a single bit in these inputs would (preferably) cause significant changes in the output. Since this is substantially random generation, the randomization logic 40 should (preferably) generate the same output for the same PID and seed input values.

A basic I-cache index is then blended (combined) with the substantially random value to generate a substantially random I-cache index (step 52). In one example, the randomization logic 40 performs an XORing operation 41 of the basic Index 30 with a random (or substantially random) value generated by the logic 40. Specifically, the operator 41 performs a bitwise exclusive-or (XOR) operation (e.g., 0110 XOR 1100=1010). An XOR operation is not the only operation that can be used to combine (blend) the Index 30 and the output of the randomization logic 30. In this example, the OS provides the PID value to the processor including the cache system 12. Software layers above the OS need not be aware of the substantially randomization process and can function properly without any changes. An example of blending the index is: 0110+1100=10010 (mod $2^4$) which results in 0010. Other examples can be used, involving operations that generate a mathematical group over the operand. The substantially randomized I-cache index is the used for mapping instructions into the I-cache (step 53).

The I-cache partitioning process and/or the I-cache substantially randomized mapping process may be implemented for the same I-cache system 12, depending on the level of security desired. To use I-cache partitioning and I-cache substantially randomized mapping together, the I-cache system can be implemented with substantially randomization logic in place (as in FIG. 9), and also uses an index with a dynamic length for partitioning (i.e., dynamically expanding/shrinking index length for defining partition areas).

Static partitioning for dedicated I-caches involves placing different individual I-caches in the processor chip. For example, for two dedicated I-caches, control logic of a 4-way set associative I-cache (including, e.g., replacement and eviction logic) can be changed to two 2-way associative I-caches of the same size.

For dynamic I-cache partitioning, during run-time the system can switch between one 4-way set associative I-cache and two 2-way associative I-caches. For example, the OS can set a flag to indicate whether a critical application is running on a logical processor.

If said OS flag is set, the I-cache should not be shared between the logical processors because the process (which can be malicious) on a logical processor can attack the critical application running on the other logical processor. The processor architecture can be designed in a way to allow such dynamic partitioning. For static partitioning, there is no need to change any software. For dynamic partitioning, the OS (or similar software that controls the system) needs to be aware of the I-cache manager operations.

In another example, partitioning the I-cache further includes partitioning the I-cache into multiple logical partitions corresponding to multiple logical processors. Providing access to each I-cache partition includes providing access to each I-cache partition only by a corresponding logical processor.

Upon detecting execution of a critical process instruction on a logical processor, access to the corresponding I-cache by other logical processors is prevented. Preventing access to the I-cache partition by said other logical processors further includes dynamically repartitioning the I-cache to only allow access to a corresponding I-cache partition by the processor executing the critical process.

Partitioning the I-cache may involve modifying the mapping index of the I-cache to include a logical processor identification, and sharing access to the I-cache may involve allowing access to different partitions of the I-cache by an I-cache mapping policy based on the logical processor identification. In addition, a substantially random I-cache mapping policy may be implemented for each cache partition. A substantially random I-cache mapping policy for each cache partition involves substantially randomizing the index section of each virtual I-cache address.

I-cache replacement comprises a method to identify a candidate I-cache block, content of which will be evicted to write new data into the I-cache. I-cache mapping comprises a method by which the data in main memory is brought into the I-cache and referenced by the processor. I-cache mapping involves determining which I-cache sets can store the content of a given memory location. The present invention provides substantially random mapping and dynamic partitioning methods along with optional cache replacement approaches.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of instruction cache (I-cache) management, comprising:
    maintaining a different substantially random instruction mapping policy into an I-cache for each of multiple processes; and
    for each process, performing a substantially random mapping scheme for mapping a process instruction into the I-cache based on the substantially random instruction mapping policy for said process;
    wherein said multiple processes include security critical process instructions, such that maintaining a different substantially random instruction mapping policy into an I-cache for each of multiple processes includes maintaining a different substantially random instruction mapping policy into the I-cache for each of multiple security critical processes.

2. The method of claim 1, wherein performing a substantially random mapping scheme further includes detecting execution of security critical processes on one or more processors, and upon receiving an instruction from a security critical process, performing a substantially random mapping scheme for mapping the instruction into the I-cache according to the substantially random instruction mapping policy for the security critical process.

3. The method of claim 1, wherein performing a substantially random I-cache mapping policy includes substantially randomizing an index portion of each virtual I-cache address.

4. The method of claim 3, wherein partitioning the I-cache further includes partitioning the I-cache into multiple logical partitions corresponding to multiple logical processors.

5. The method of claim 4, wherein providing access to each I-cache partition further includes providing access to each I-cache partition only by a corresponding logical processor.

6. The method of claim 5 further including the step: upon detecting execution of a critical process instruction on a logical processor, preventing access to a corresponding I-cache partition by other logical processors.

7. The method of claim 1 further comprising:
    partitioning an I-cache into multiple logical partitions; and
    sharing access to the I-cache by an I-cache mapping policy that provides access to each I-cache partition by only one logical processor.

8. The method of claim 1, further comprising:
    partitioning the I-cache into multiple logical partitions corresponding to multiple logical processors including dynamically modifying a mapping index of the I-cache to include a logical processor identification; and
    sharing access to the I-cache includes allowing access to different partitions of the I-cache by an I-cache mapping policy based on the logical processor identification.

9. The method of claim 8 further including implementing a substantially random I-cache mapping policy for each cache partition.

10. The method of claim 9, wherein a substantially random I-cache mapping policy for each cache partition includes substantially randomizing the index section of each virtual I-cache address.

11. The method of claim 10, wherein substantially randomizing the index section of each virtual I-cache address includes XORing the address with a substantially random value.

12. The method of claim 10 further including obtaining a different substantially random value for each active process running on a logical processor, for substantially randomizing the I-cache mapping policy for the I-cache partitions.

13. The method of claim 1, wherein the instruction processing is implemented on a simultaneous multithreading (SMT) processor.

14. A method of instruction cache (I-cache) management, comprising:
    maintaining a different substantially random instruction mapping policy into an I-cache for each of multiple processes; and for each process, performing a substantially random mapping scheme for mapping a process instruction into the I-cache based on the substantially random instruction mapping policy for said process;
    partitioning the I-cache into multiple logical partitions corresponding to multiple logical processors; and
    upon detecting execution of a critical process instruction on a logical processor, preventing access to a corresponding I-cache partition by other logical processors;
    wherein preventing access to the I-cache partition by said other logical processors includes dynamically repartitioning the I-cache to only allow access to the corresponding I-cache partition by the processor executing the critical process.

15. The method of claim 14, further wherein said multiple processes include security critical process instructions, such that maintaining a different substantially random instruction mapping policy into an I-cache for each of multiple processes includes maintaining a different substantially random instruction mapping policy into the I-cache for each of multiple security critical processes.

16. The A method of instruction cache (I-cache) management, comprising:
    maintaining a different substantially random instruction mapping policy into an I-cache for each of multiple processes; and
    for each process, performing a substantially random mapping scheme for mapping a process instruction into the I-cache based on the substantially random instruction mapping policy for said process;
    wherein performing a substantially random I-cache mapping policy includes substantially randomizing an index portion of each virtual I-cache address by:
    generating a substantially random value from a seed value;
    blending the basic I-cache index with the substantially random value to generate a substantially random I-cache index; and
    using the substantially random I-cache index for the I-cache instruction mapping.

17. The method of claim 16, wherein generating a substantially random value from a seed includes consecutively computing hash values from an initial seed for each different I-cache access and selecting a set of bits of the hash value to generate a substantially random number.

18. The method of claim 16, further wherein said multiple processes include security critical process instructions, such that maintaining a different substantially random instruction mapping policy into an I-cache for each of multiple processes includes maintaining a different substantially random instruction mapping policy into the I-cache for each of multiple security critical processes.

19. An instruction cache system, comprising:
an instruction cache; and
a cache manager configured for maintaining a different substantially random instruction mapping policy into an I-cache for each of multiple processes, and for each process, performing a substantially random mapping scheme for mapping a process instruction into the I-cache based on the substantially random instruction mapping policy for said process;
wherein said multiple processes include security critical process instructions, such that the cache manager is configured for maintaining a different substantially random instruction mapping policy into the I-cache for each of multiple security critical processes.

20. The system of claim 19, wherein the cache manager is further configured for detecting execution of security critical processes on one or more processors, and upon receiving an instruction from a security critical process, performing a substantially random mapping scheme for mapping the instruction into the I-cache according to the substantially random instruction mapping policy for the security critical process.

21. The system of claim 19, wherein the cache manager is further configured for substantially randomizing an index portion of each virtual I-cache address.

22. The system of claim 21, wherein the cache manager is configured for partitioning the I-cache into multiple logical partitions corresponding to multiple logical processors.

23. The system of claim 22, wherein the cache manager is configured for providing access to each I-cache partition only by a corresponding logical processor.

24. The system of claim 23, wherein the cache manager is configured for detecting execution of a critical process instruction on a processor, and preventing access to a corresponding I-cache partition by other processes.

25. The system of claim 19, wherein the cache manager is further configured for partitioning an I-cache into multiple logical partitions, and providing access to the I-cache by an I-cache mapping policy that provides access to each I-cache partition by only one logical processor.

26. The system of claim 19, wherein the cache manager is further configured for partitioning the I-cache by dynamically modifying the mapping index of the I-cache to include logical processor identification, and allowing access to different partitions of the I-cache by an I-cache mapping policy based on logical processor identification.

27. The system of claim 26, wherein the cache manager is configured for implementing a substantially random I-cache mapping policy for each cache partition.

28. The system of claim 27, wherein the cache manager is further configured for a substantially random I-cache mapping policy for each cache partition by substantially randomizing the index section of each virtual I-cache address.

29. The system of claim 28, wherein the cache manager is further configured for substantially randomizing the index section of each virtual I-cache address by XORing the address with a substantially random value.

30. The system of claim 28, wherein the cache manager is further configured for obtaining a different substantially random value for each active process running on a logical processor, for substantially randomizing the I-cache mapping policy for the I-cache partitions.

31. An instruction cache system, comprising:
an instruction cache; and
a cache manager configured for maintaining a different substantially random instruction mapping policy into an I-cache for each of multiple processes, and for each process, performing a substantially random mapping scheme for mapping a process instruction into the I-cache based on the substantially random instruction mapping policy for said process;
wherein the cache manager is configured for partitioning the I-cache into multiple logical partitions corresponding to multiple logical processors and the cache manager is configured for dynamically repartitioning the I-cache to only allow access to the corresponding I-cache partition by the processor executing a critical process.

32. The system of claim 31 wherein said multiple processes include security critical process instructions, such that the cache manager is configured for maintaining a different substantially random instruction mapping policy into the I-cache for each of multiple security critical processes.

33. The system of claim 31, wherein the cache manager is further configured for detecting execution of security critical processes on one or more processors, and upon receiving an instruction from a security critical process, performing a substantially random mapping scheme for mapping the instruction into the I-cache according to the substantially random instruction mapping policy for the security critical process.

34. The system of claim 31, wherein the cache manager is further configured for substantially randomizing an index portion of each virtual I-cache address.

35. A method of instruction cache (I-cache) management, comprising:
maintaining a different substantially random instruction mapping policy into an I-cache for each of multiple processes; and
for each process, performing a substantially random mapping scheme for mapping a process instruction into the I-cache based on the substantially random instruction mapping policy for said process;
partitioning the I-cache includes dynamically modifying the mapping index of the I-cache to include a logical processor identification; and
sharing access to the I-cache includes allowing access to different partitions of the I-cache by an I-cache mapping policy based on the logical processor identification.

36. The method of claim 35, wherein performing a substantially random mapping scheme further includes detecting execution of security critical processes on one or more processors, and upon receiving an instruction from a security critical process, performing a substantially random mapping scheme for mapping the instruction into the I-cache according to the substantially random instruction mapping policy for the security critical process.

37. An instruction cache system, comprising:
an instruction cache; and
a cache manager configured for maintaining a different substantially random instruction mapping policy into an I-cache for each of multiple processes, and for each process, performing a substantially random mapping scheme for mapping a process instruction into the I-cache based on the substantially random instruction mapping policy for said process;
wherein the cache manager is further configured for partitioning the I-cache by dynamically modifying the mapping index of the I-cache to include logical processor identification, and allowing access to different partitions of the I-cache by an I-cache mapping policy based on logical processor identification.

38. The system of claim 37, wherein the cache manager is further configured for detecting execution of security critical processes on one or more processors, and upon receiving an instruction from a security critical process, performing a substantially random mapping scheme for mapping the instruction into the I-cache according to the substantially random instruction mapping policy for the security critical process.

39. An instruction cache system, comprising:
an instruction cache; and
a cache manager configured for maintaining a different substantially random instruction mapping policy into an I-cache for each of multiple processes, and for each process, performing a substantially random mapping scheme for mapping a process instruction into the I-cache based on the substantially random instruction mapping policy for said process;
wherein the cache manager is configured to perform a substantially random I-cache mapping policy including substantially randomizing an index portion of each virtual I-cache address by:
generating a substantially random value from a seed value;
blending the basic I-cache index with the substantially random value to generate a substantially random I-cache index; and
using the substantially random I-cache index for the I-cache instruction mapping.

40. The system of claim 39, wherein generating a substantially random value from a seed includes consecutively computing hash values from an initial seed for each different I-cache access and selecting a set of bits of the hash value to generate a substantially random number.

* * * * *